US011999164B2

(12) United States Patent
Yamazaki

(10) Patent No.: US 11,999,164 B2
(45) Date of Patent: Jun. 4, 2024

(54) RECORDING DEVICE

(71) Applicant: SEIKO EPSON CORPORATION, Tokyo (JP)

(72) Inventor: Shinya Yamazaki, Asahi-Mura (JP)

(73) Assignee: Seiko Epson Corporation, Tokyo (JP)

( * ) Notice: Subject to any disclaimer, the term of this patent is extended or adjusted under 35 U.S.C. 154(b) by 116 days.

(21) Appl. No.: 17/818,645

(22) Filed: Aug. 9, 2022

(65) Prior Publication Data

US 2023/0158796 A1 May 25, 2023

(30) Foreign Application Priority Data

Aug. 10, 2021 (JP) ................................ 2021-130546

(51) Int. Cl.
*B41J 2/045* (2006.01)
*B41J 2/165* (2006.01)
*B41J 11/00* (2006.01)

(52) U.S. Cl.
CPC ....... *B41J 2/04556* (2013.01); *B41J 2/16526* (2013.01); *B41J 11/0095* (2013.01)

(58) Field of Classification Search
CPC ................ B41J 2/04556; B41J 2/16526; B41J 11/0095; B41J 2/16523; B41J 2/16508
See application file for complete search history.

(56) References Cited

U.S. PATENT DOCUMENTS

2008/0180686 A1* 7/2008 Sakai .................... G02B 5/201 347/20

FOREIGN PATENT DOCUMENTS

JP 2007-062228 3/2007

* cited by examiner

*Primary Examiner* — Bradley W Thies
(74) *Attorney, Agent, or Firm* — WORKMAN NYDEGGER

(57) ABSTRACT

A recording device includes a recording head configured to discharge ink onto a recording medium to perform recording, a carriage mounted with the recording head, and configured to perform scanning, a liquid receiving portion disposed so as to face the recording head, so that the recording head discards the ink into the liquid receiving portion, a distance sensor configured to measure a position of a top portion in a vertical direction of a deposit formed by the ink deposited in the liquid receiving portion, and a control unit configured to determine, based on a result of the measurement by the distance sensor, whether the deposit in the liquid receiving portion needs to be removed.

8 Claims, 10 Drawing Sheets

RECORDING DEVICE

The present application is based on, and claims priority from JP Application Serial Number 2021-130546, filed Aug. 10, 2021, the disclosure of which is hereby incorporated by reference herein in its entirety.

BACKGROUND

1. Technical Field

The present disclosure relates to a recording device.

2. Related Art

In the past, a recording device has been known that performs recording by attaching ink discharged from a recording head to a recording medium. In such a recording device, an ink deposit may be generated due to ink discard from the recording head or so-called frame-less printing. As the ink deposition progresses, the ink deposit may grow and interfere with the recording head. For example, JP 2007-62228 A discloses a recording device that performs flushing processing for a liquid discarding unit with ink discharged from a recording head.

However, in the recording device described in JP 2007-62228 A, there has been a problem in that excess or deficiency easily occurs in the flushing processing for the liquid discarding unit. Specifically, a progress of ink drying varies depending on environment, and thus there are variations in likelihood of occurrence of the ink deposit. In the recording device described above, the flushing processing is performed each time the frame-less printing is performed. As a result, there has been a possibility that the flushing processing is excessively performed, and thus the ink used in the flushing processing is wasted. In addition, when the number of times of the flushing processing is reduced, there has been a possibility that the deposition proceeds at an unexpected rate. That is, there has been a demand for a recording device in which an ink deposit can be removed as necessary.

SUMMARY

A recording device includes a recording head configured to discharge liquid onto a recording medium to perform recording, a carriage mounted with the recording head, and configured to perform scanning, a liquid receiving portion disposed so as to face the recording head so that the recording head discards the liquid into the liquid receiving portion, a measurement unit configured to measure a position of a top portion in a vertical direction of a deposit formed by the liquid deposited in the liquid receiving portion, and a control unit configured to determine, based on a result of the measurement by the measurement unit, whether the deposit in the liquid receiving portion needs to be removed.

BRIEF DESCRIPTION OF THE DRAWINGS

FIG. 4 is a schematic plan view illustrating an arrangement of a distance sensor, a liquid receiving portion, and the like.

FIG. 5 is a schematic plan view illustrating another arrangement of the distance sensor and the like.

FIG. 6 is a schematic plan view illustrating still another arrangement of the distance sensor and the like.

DESCRIPTION OF EXEMPLARY EMBODIMENTS

In the exemplary embodiments described below, a large format type recording device used for printing a signage or the like will be illustrated and described with reference to the drawings.

In each of the drawings, XYZ axes are provided, as necessary, as coordinate axes orthogonal to each other, and a direction indicated by each arrow is referred to as a + direction, and a direction opposite to the + direction is referred to as a − direction. The Y-axis is along a front-rear direction of the recording device. The X-axis is along a left-right direction of the recording device, and a +X direction of the recording device is referred to as a right side. Also, the +X direction and a −X direction, which are directions along the X-axis, may be collectively referred to as an X direction. The Z-axis is a virtual axis along a vertical direction, and a +Z direction of the recording device is referred to as an upside. Note that, for convenience of illustration, a size of each member is made different from that of the actual member.

1. First Exemplary Embodiment

Figure 1:
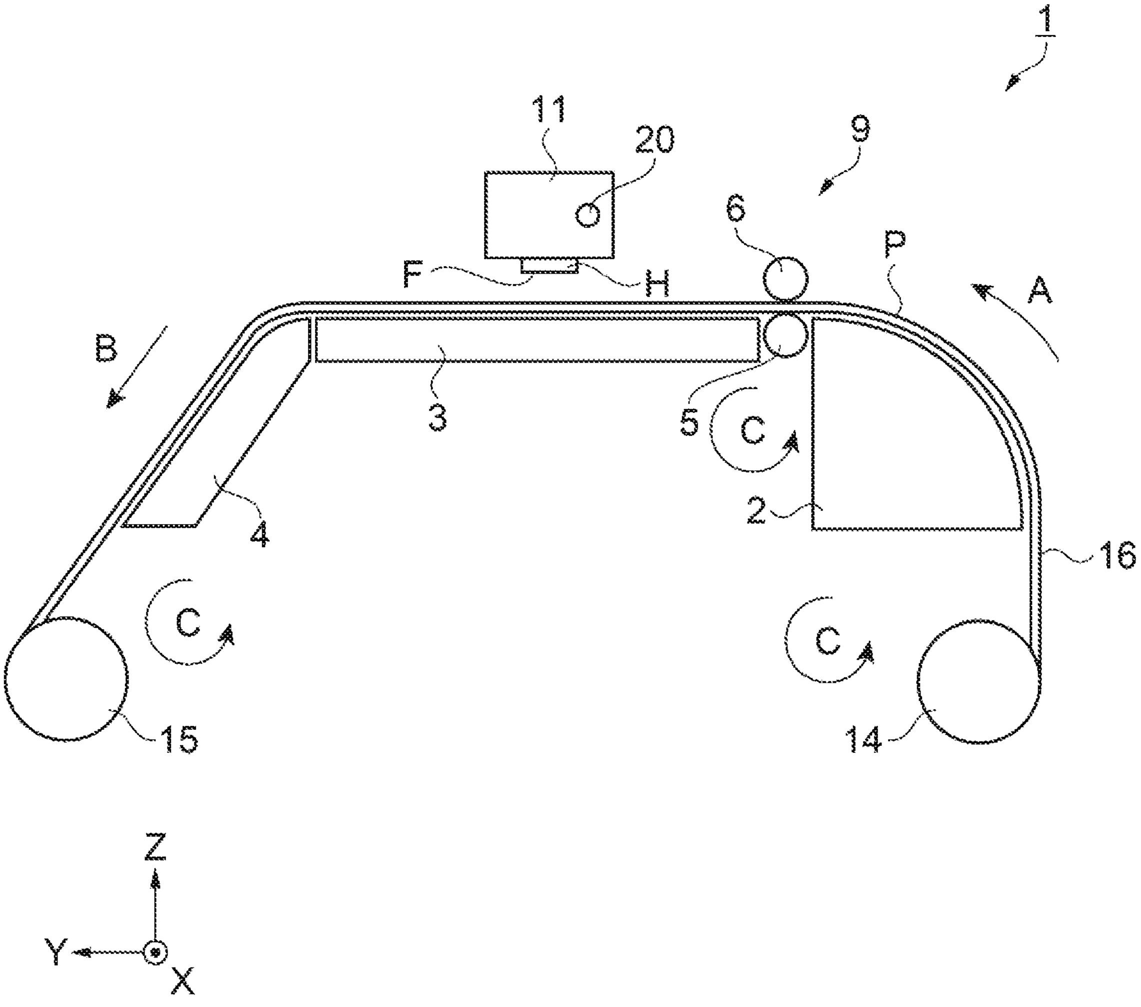
FIG. 1 is a schematic side view illustrating a configuration of a recording device according to a first exemplary embodiment.

As illustrated in FIG. 1, a recording device 1 according to the present exemplary embodiment includes a recording head H, a carriage 11, and a platen 3. Although not illustrated, the recording device 1 also includes a liquid receiving portion, a distance sensor as a measurement unit, and a control unit.

The recording head H is mounted at the carriage 11. The platen 3 is disposed facing the recording head H in a direction along the Z-axis. The recording head H discharges ink that is liquid to a recording medium P supported by the platen 3 to perform recording. Note that, in the description of FIG. 1, a state in side view from the +X direction will be described unless otherwise noted. Also, the number of the recording heads H mounted at the carriage 11 is not limited to one.

The recording head H is mounted at a lower surface, which is a surface on a lower side of the carriage 11, so as to face a −Z direction. The recording head H includes a nozzle surface F in the −Z direction. A nozzle described later is provided at the nozzle surface F. An ink droplet is discharged from the nozzle.

A pipe from an ink tank (not illustrated) is coupled to the recording head H. In the ink tank, a color ink that exhibits each color or a white ink is individually stored. In addition, a processing liquid such as a pretreatment agent or a coating liquid may be stored in the ink tank. In the present specification, liquids such as ink and a processing liquid are collectively referred to as ink.

The recording device 1, although not illustrated, includes a cleaning liquid tank that stores a cleaning liquid, separately from the ink tank. The cleaning liquid is delivered from the cleaning liquid tank to the liquid receiving portion via a pipe, a pump, and the like. The cleaning liquid has a function of cleaning and removing an ink deposit generated in the liquid receiving portion. The cleaning liquid includes, a surfactant, and the like, in addition to water and a solvent such an organic solvent. The removal of an ink deposit by the cleaning liquid will be described later. Note that, in the following description, an ink deposit will also be simply referred to as a deposit.

The nozzle surface F of the recording head H is disposed facing the platen 3 via the recording medium P when the recording device 1 performs recording. The recording head H is an ink jet head that is driven for discharge by a piezoelectric element. The means for driving for discharge in the recording head H is not limited to the piezoelectric element.

The carriage 11 is disposed facing the platen 3. The carriage 11 is supported by a guide shaft 20 extending along a width direction X of an end portion side in the −Y direction, and reciprocates in the X direction with respect to the recording medium P by a carriage driving unit (not illustrated). In other words, the carriage 11 performs scanning in the X direction intersecting the +Y direction that is a transport direction in which the recording medium P is transported on the platen 3. The carriage driving unit applies driving force for reciprocation to the carriage by a carriage motor described below. A position in the X direction of the carriage 11 is detected by an encoder provided in the carriage driving unit.

The recording device 1 includes, as a mechanism for transporting and supporting the recording medium P, a feeding unit 14, support portions 2, 4, a transporting unit 9, the platen 3, and a winding unit 15. In the feeding unit 14, the recording medium P in a roll shape before recording is unwound and transported to the platen 3. In the winding unit 15, the recording medium P after recording is wound in a roll shape. In other words, the roll-shaped recording medium P can be applied to recording by the recording device 1. The recording medium P is not limited to be in the roll shape, and may have a single sheet shape. Additionally, the recording device 1 may be a flat bed type in which the recording medium P is not transported and recording is performed.

The recording medium P is transported by the transport unit 9 from the feeding unit 14. At this time, the roll-shaped recording medium P is rotated and unwound, for example, in a rotational direction C, such that a recording surface 16 faces upward on the platen 3.

The recording medium P unwound and transported upward from the feeding unit 14 reaches the support portion 2. A region of the support portion 2 in contact with the recording medium P is formed in an arc shape. The recording medium P is transported in a transport direction A while being in contact with the above region of the support portion 2. Thus the recording medium P reaches the transport unit 9.

The transport unit 9 includes a driving roller 5 and a driven roller 6. The driving roller 5 and the driven roller 6 are disposed between the support portion 2 and the platen 3. The driven roller 6 is located above the driving roller 5. The driving roller 5 and the driven roller 6 are each cylindrical, and each rotational axis is along the X-axis.

The driving roller 5 and the driven roller 6 rotate sandwiching the recording medium P to transport the recording medium P in the +Y direction. Specifically, the driving roller 5 and the driven roller 6 unwind and pull out the roll-shaped recording medium P from the feeding unit 14, and transport the recording medium P via the support portion 2 to the platen 3. The driving roller 5 rotates in the rotation direction C, which is counterclockwise, by driving of a transport motor described below. The driven roller 6 rotates clockwise corresponding to the rotation of the driving roller 5. As a result, the recording medium P reaches the platen 3.

An upper surface of the platen 3 is formed in a flat plate shape. The upper surface of the platen 3 is substantially along an XY plane. At the platen 3, an ink droplet is discharged from the recording head H onto the recording medium P. At this time, the recording medium P is transported in the +Y direction while being supported by the upper surface of the platen 3. Also, the recording head H scans in the X direction. Therefore, the recording head H can scan relatively in the X direction for the recording medium P, and can move relatively in a direction along the Y-axis. As a result, images, texts, patterns and the like are formed on the recording medium P, and recording is performed. Then, the recording medium P reaches the support portion 4 from the platen 3.

The support portion 4 is disposed in the +Y direction of the platen 3. The +Y direction of the support portion 4 is inclined downward. By the inclination of the support portion 4, the support portion 4 guides the transport direction of the recording medium P from the +Y direction to a transport direction B. The winding unit 15 is provided ahead the inclination of the support portion 4.

The winding unit 15 is rotated, by driving of a motor (not illustrated), for example, in the rotation direction C to wind the recording medium P in a roll shape.

Figure 2:
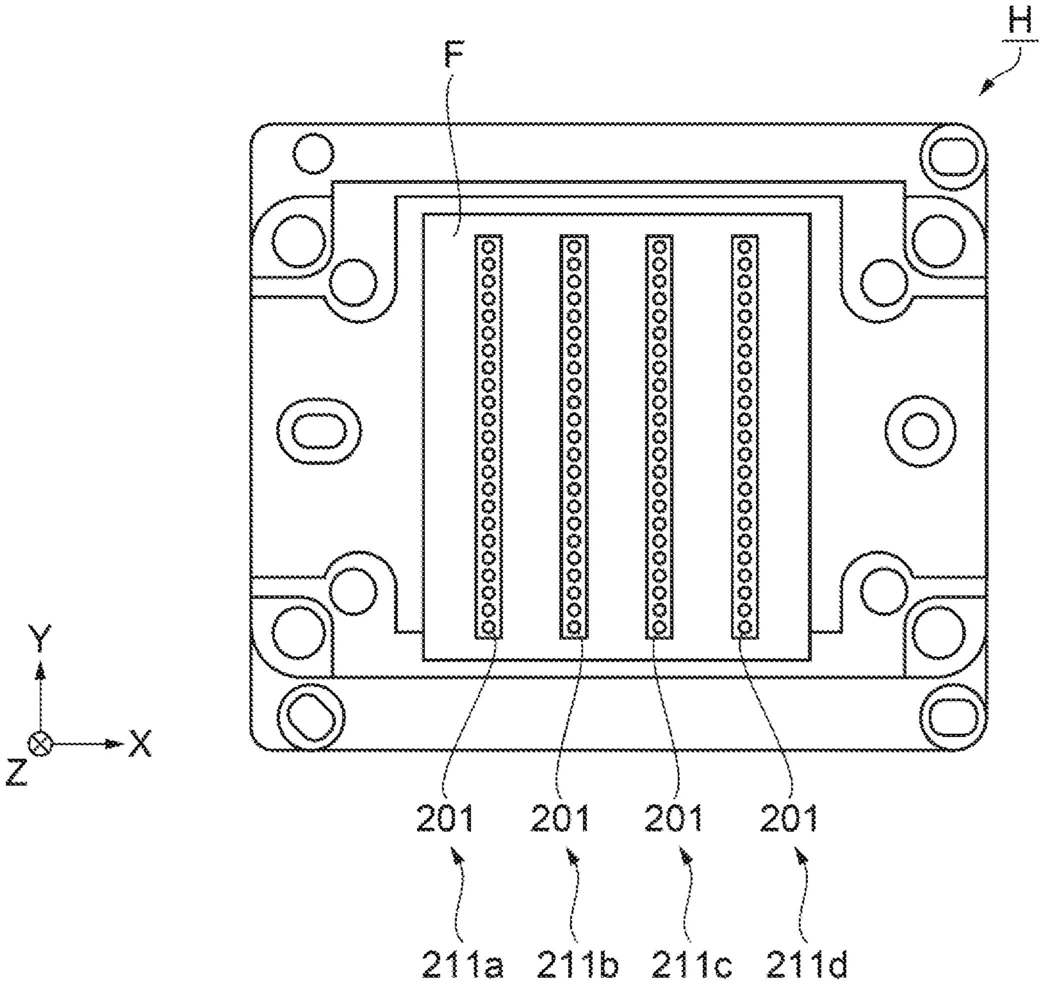
FIG. 2 is a plan view illustrating a configuration of a recording head.
Figure 3:
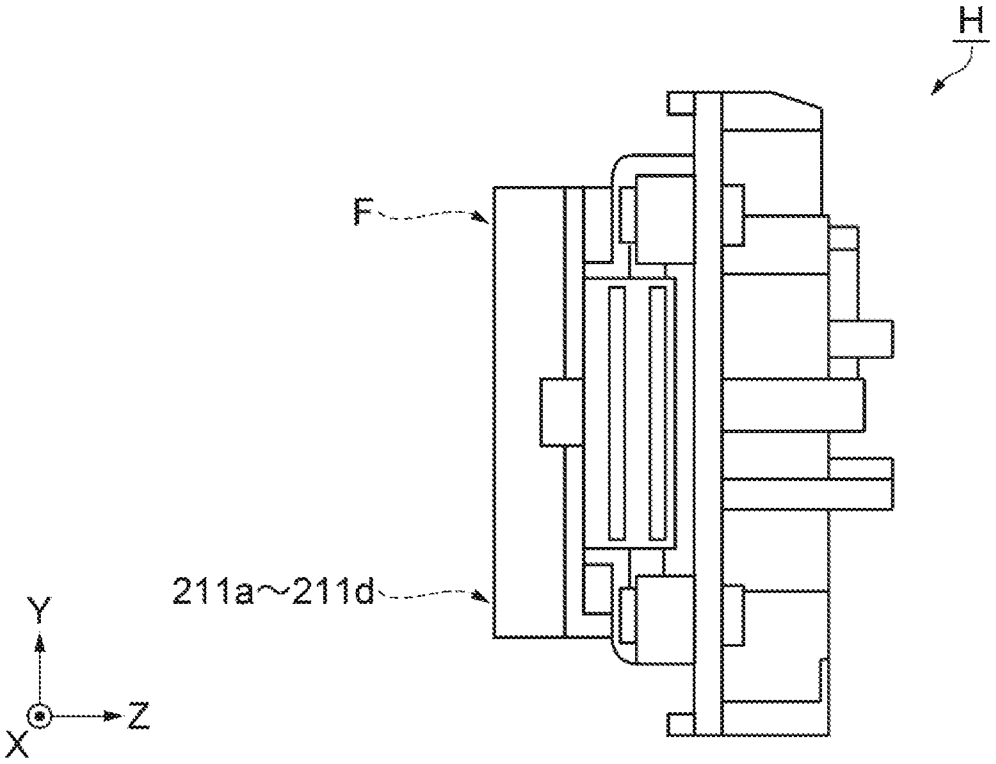
FIG. 3 is a side view illustrating the configuration of the recording head.

As illustrated in FIG. 2, in plan view from the −Z direction, the recording head H is substantially rectangular, and the nozzle surface F being substantially rectangular is provided at a center of the recording head H. As illustrated in FIG. 3, the nozzle surface F is substantially along the XY plane. The nozzle surface F protrudes from a main body of the recording head H in the −Z direction in side view from the +X direction.

Four nozzle rows 211*a*, 211*b*, 211*c*, and 211*d* are disposed at the nozzle surface F in this order toward the +X direction. Each of the nozzle rows 211*a*, 211*b*, 211*c*, and 211*d* extends along the Y-axis. Each of the nozzle rows 211*a*, 211*b*, 211*c*, and 211*d* includes a plurality of nozzles 201. An ink droplet of a corresponding type is discharged from each nozzle 201 of the nozzle rows 211*a*, 211*b*, 211*c*, and 211*d*. The nozzle row disposed at the nozzle surface F is not limited to the configuration described above.

Figure 4:
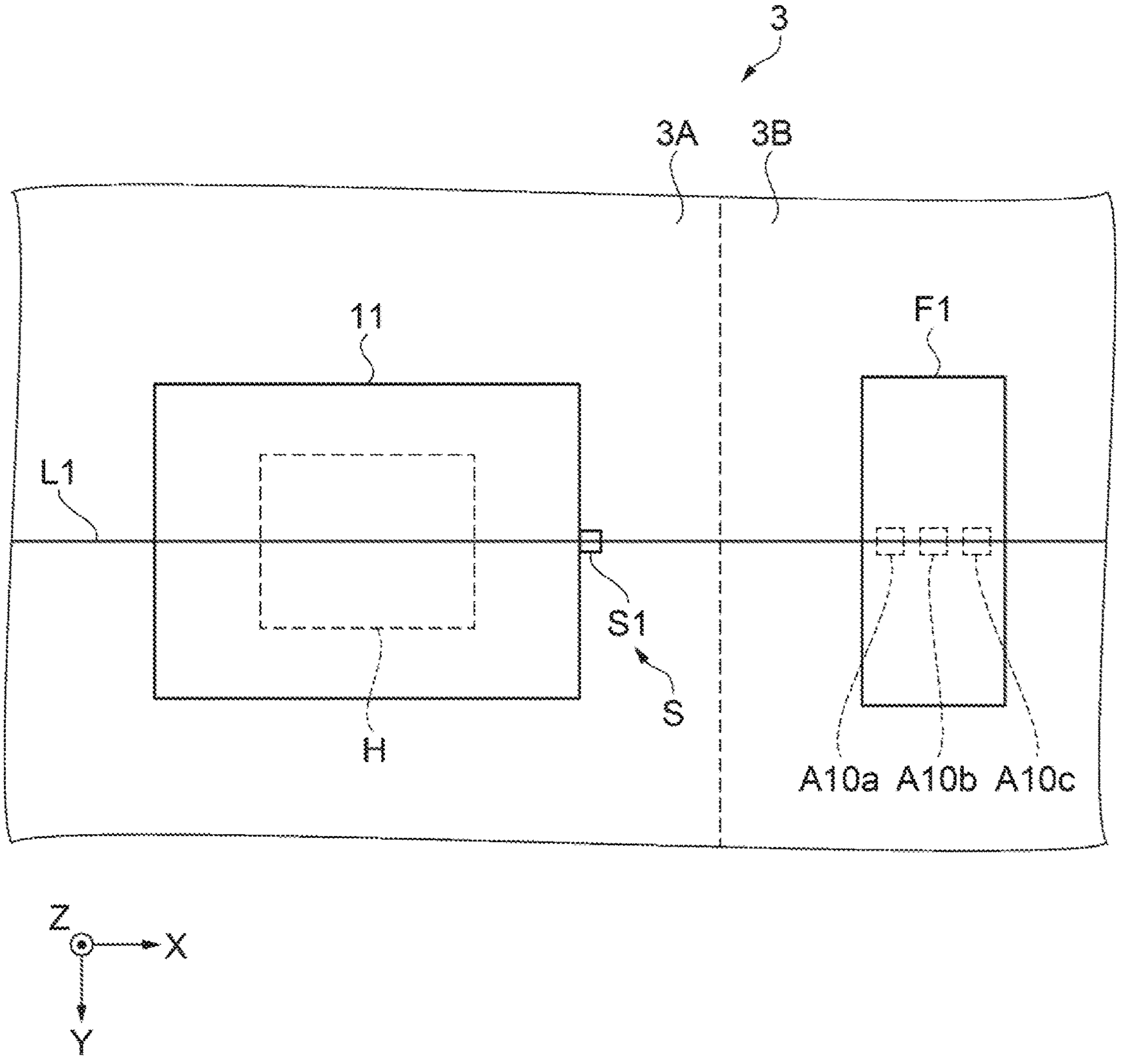

As illustrated in FIG. 4, the platen 3 includes platens 3A and 3B adjacent to each other. In FIG. 4, a vicinity of a boundary between the platen 3A and the platen 3B in the +X direction in a range in which the carriage 11 performs scanning is viewed from a higher perspective, and a state is illustrated where the carriage 11 is present in the vicinity of the boundary. Further, the recording head H disposed below the carriage 11 is indicated by a dashed line. In the following description using a plan view including FIG. 4, a planar state in plan view from above will be described, unless otherwise noted.

The platen 3A is a transport path through which the recording medium P (not illustrated) is transported. In other words, a range in a direction along the X-axis of the platen 3A is also a scanning range in which the carriage 11 performs scanning during recording by the recording device 1.

The platen 3B is provided on an outer side in the +X direction with respect to the platen 3A, which is the transport path of the recording medium P. The boundary between platen 3A and platen 3B extends along the Y-axis. The platen 3B is not limited to be disposed in the +X direction with respect to the platen 3A, and may be disposed in the −X direction.

The carriage 11 is substantially rectangular, and the recording head H is mounted therebelow. A distance sensor S is mounted at a position, of the carriage 11, that can face a liquid receiving portion F1. The distance sensor S includes a distance sensor S1. The distance sensor S1 is disposed at a center of a side along the Y-axis, in the +X direction of the carriage 11. FIG. 4 illustrates a configuration including one distance sensor S as a measurement unit, that is, a configuration including the distance sensor S1.

The liquid receiving portion F1 is disposed at the platen 3B that is outside the transport path of the recording medium P described above. The liquid receiving portion F1 is disposed so as to be able to face the recording head H by the carriage 11 performing scanning in the +X direction. The liquid receiving portion F1 is a substantially rectangular opening that is opened upward. A length in a direction along the Y-axis of the liquid receiving portion F1 is substantially equal to a length in a direction along the Y-axis of the carriage 11, and is longer than a length in a direction along the Y-axis of the nozzle surface F. A length in the X direction of the liquid receiving portion F1 is shorter than a length in the X direction of the carriage 11, and is shorter than a length in the X direction of the nozzle surface F.

Ink is discarded from the recording head H into the liquid receiving portion F1. Specifically, at the time before recording by the recording device 1 is started, during recording, after cleaning of the nozzle 201, or the like, respective inks are discarded from the plurality of nozzles 201 of the recording head H, into the liquid receiving portion F1. As a result, the ink in each nozzle 201 is refreshed, and printing quality of the recording device 1 is maintained.

An absorbent material (not illustrated) is disposed in the opening of the liquid receiving portion F1. The absorbent material is made of a porous member such as a sponge, or a non-woven fabric, and receives and absorbs the ink discarded in the liquid receiving portion F1. This reduces dispersion of the ink when the ink is discarded. Although not illustrated, a pipe from the cleaning liquid tank described above is coupled to the liquid receiving portion F1. Furthermore, the liquid receiving portion F1 is coupled to a waste liquid portion via another pipe and the ink discarded in the liquid receiving portion F1, and the cleaning liquid supplied to the liquid receiving portion F1 are emitted to the waste liquid portion. A suction mechanism such as a pump may be provided between the waste liquid portion and the liquid receiving portion F1. Furthermore, the cleaning liquid may be delivered from the cleaning liquid tank to the carriage 11, and supplied to the liquid receiving portion F1 from a nozzle provided at the carriage 11.

In the past, depending on operating conditions or installation environments, there has been a possibility that a deposit is generated and grows that is formed of deposited ink at a member to which the ink is discarded. Therefore, in the recording device 1, the distance sensor S measures a position of a top portion of the deposit in a direction along the Z-axis, that is, a height of the deposit.

The distance sensor S is a non-contact type distance measurement device. Types of the distance sensor S include an optical type, a sonic type, and an ultrasonic type. In the present exemplary embodiment, as the distance sensor S, an ultrasonic sensor including a thin film piezoelectric element described below is adopted.

The ultrasonic sensor includes a substrate having an opening portion that penetrates in a thickness direction, a vibrating plate that covers the opening portion, a thin film piezoelectric element provided at a position corresponding to an opening portion in a back surface of the vibrating plate, and an elastic layer present on an inner side of the opening portion, and facing the thin film piezoelectric element via the vibrating plate. A vibration region of the vibrating plate and the thin film piezoelectric element constitute one ultrasonic transducer.

In the ultrasonic sensor, by applying a pulse voltage of a predetermined frequency between two electrodes of the thin film piezoelectric element, the thin film piezoelectric element bends and the vibration region vibrates, and ultrasonic waves are transmitted from the opening portion. In addition, when ultrasonic waves propagated toward the ultrasonic sensor vibrate the vibration region of the vibrating plate, a potential difference is generated between the two electrodes of the thin film piezoelectric element. By detecting the potential difference, timing of transmission or reception of ultrasonic waves can be detected. Furthermore, the distance sensor S includes a temperature/humidity sensor, and calculates sound velocity from a temperature and humidity measured. The temperature/humidity sensor need not be disposed at the same position as that of the distance sensor S.

According to the configuration described above, by transmitting ultrasonic waves to a measurement target, and receiving the ultrasonic waves reflected by the measurement target, a distance between the ultrasonic sensor and the measurement target can be measured. Note that, the ultrasonic sensor of the present exemplary embodiment is a small ultrasonic sensor specialized for a case where a target object is at a short distance.

According to the ultrasonic sensor including the thin film piezoelectric element, spatial resolution in distance measurement can be improved compared to an ultrasonic sensor without a thin film piezoelectric element. In addition, miniaturization can be easily achieved compared to an optical type or a sound wave type sensor. Therefore, the distance sensor S is small and lightweight, and is easily mounted at the carriage 11. Furthermore, the ultrasonic sensor also includes an advantage that a measurement result is unlikely to be affected by a color or surface reflectivity of a deposit as a measurement target compared to an optical type sensor.

When the carriage 11 performs scanning in the X direction, the distance sensor S1 moves on a virtual straight line L1. The virtual straight line L1 crosses a substantially central part in a direction along the Y-axis of the liquid receiving portion F1. Therefore, the distance sensor S1 can measure a distance between the distance sensor S1 and a deposit in a wide range while crossing above the liquid receiving portion F1.

A measurement position of the distance sensor S1 in the liquid receiving portion F1 is not particularly limited, and any number and an any arrangement can be set. Specifically, for example, at a position where the virtual straight line L1 and the liquid receiving portion F1 planarly overlap, three measurement regions A10*a*, A10*b*, and A10*c* are provided, as measurement regions A. In particular, the measurement region A10*b* includes a center of the liquid receiving portion F1. At the center of the liquid receiving portion F1, a deposit easily grows, and thus measurement may be performed at the center of the liquid receiving portion F1.

Here, the number of measurement regions A is not limited to three. Additionally, in the present exemplary embodiment, the measurement by the distance sensor S is performed in a state where the distance sensor S and the measurement region A face each other in a direction along the Z-axis, but the present disclosure is not limited thereto. A direction of ultrasonic waves transmitted from the distance sensor S may be along the X-axis or the Y-axis, or may cross either of the XYZ axes.

Although not illustrated, a standby unit of the recording head H is disposed in the +X direction of the liquid receiving portion F1. The standby unit has a sealing mechanism in close contact with the recording head H, and a suction mechanism. In the standby unit, cleaning of the recording head H is performed, and during a pause of the recording device 1, the sealing mechanism is in close contact with the recording head H to suppress drying of ink in the nozzle 201.

Note that, the liquid receiving portion of the present disclosure is not limited to the configuration and embodiment described above, and for example, may be disposed in a discard region of ink in frame-less printing, or may be used in conjunction with the above standby unit.

The arrangement of the distance sensor S and the measurement region A is not limited to the above. The distance sensor S may be provided at a plurality of locations where a position of a top portion of a deposit can be measured. The distance sensor S and the measurement region A may have, for example, a configuration described below.

Figure 5:
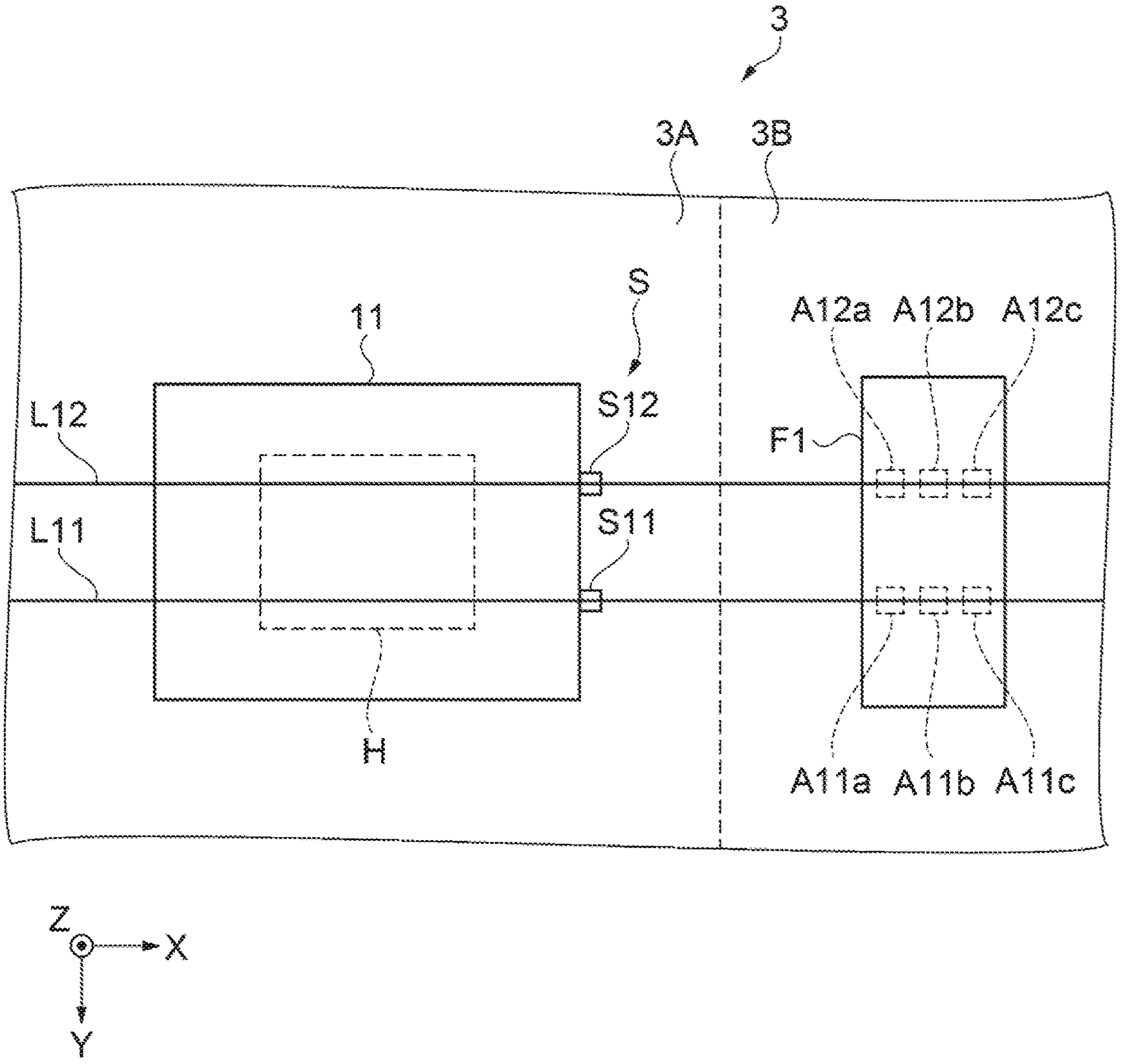

As illustrated in FIG. 5, two distance sensors S11 and S12 may be disposed as the distance sensors S on a side in the +X direction of the carriage 11. The distance sensor S11 is on a virtual straight line L11. The distance sensor S11 measures a height of a deposit in three measurement regions A11*a*, A11*b*, and A11*c* being the measurement regions A. The distance sensor S12 is on a virtual straight line L12. The distance sensor S12 measures a height of a deposit in three measurement regions A12*a*, A12*b*, and A12*c* being the measurement regions A.

Figure 6:
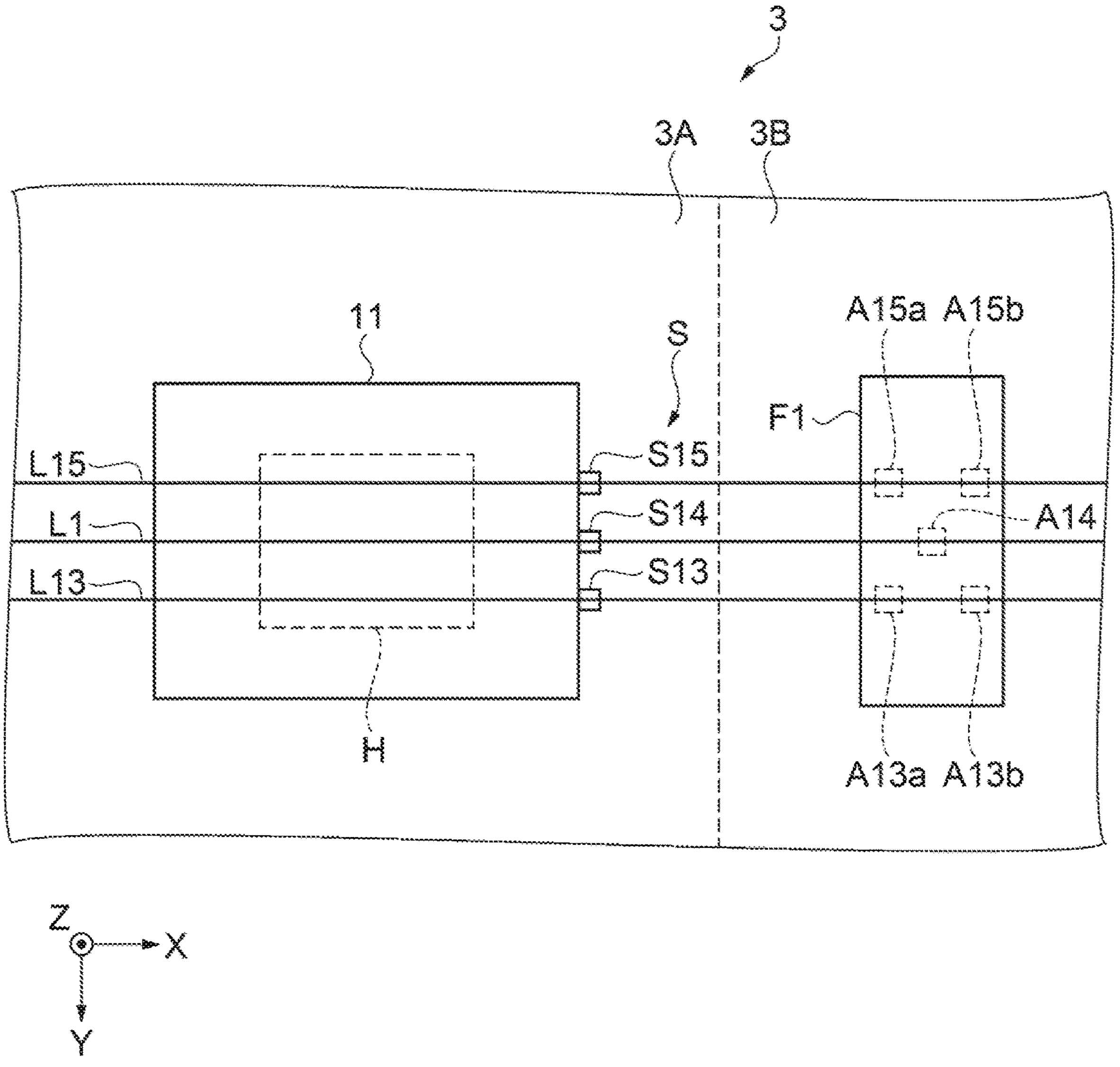

As illustrated in FIG. 6, three distance sensors S13, S14, and S15 may be disposed as the distance sensors S on a side in the +X direction of the carriage 11. The distance sensor S13 is on a virtual straight line L13. The distance sensor S13 measures a height of a deposit in two measurement regions A13*a* and A13*b* being the measurement regions A. The distance sensor S14 is on the virtual straight line L1. The distance sensor S14 measures a height of a deposit in a measurement region A14 being the measurement region A. The measurement region A14 is located at the center of the liquid receiving portion F1. The distance sensor S15 is on a virtual straight line L15. The distance sensor S15 measures a height of a deposit in two measurement regions A15*a* and A15*b* being the measurement regions A.

This increases the number of distance sensors S, so it is possible to detect growth of a deposit in a wide range.

Here, when a plurality of the distance sensors S are provided at the carriage 11, the plurality of distance sensors S may be disposed shifted from each other when viewed from the +Y direction, which is the transport direction of the recording medium P. Specifically, among the plurality of distance sensors S, some may be disposed on a side in the +X direction of the carriage 11, and others may be disposed on a lower surface of the carriage 11. Also, the distance sensor S may be disposed on a side in the −X direction of the carriage 11.

Figure 7:
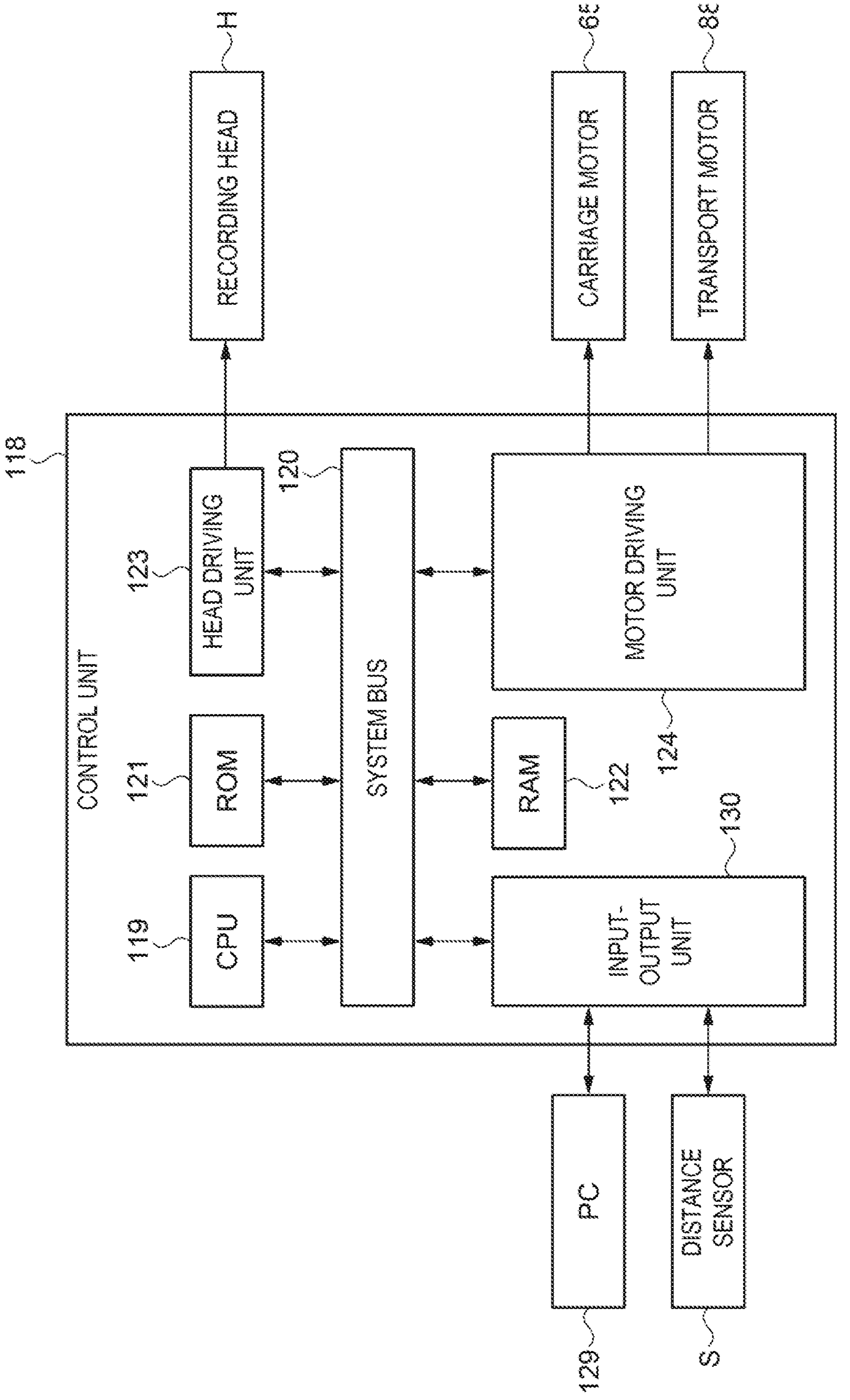
FIG. 7 is a block diagram of the recording device.

As illustrated in FIG. 7, a control unit 118 includes a CPU (Central Processing Unit) 119, a system bus 120, a ROM (Read Only Memory) 121, a RAM (Random Access Memory) 122, a head driving unit 123, a motor driving unit 124, and an input-output unit 130.

The CPU 119 controls the entire recording device 1. The CPU 119 is electrically coupled to the ROM 121, the RAM 122, and the head driving unit 123 via the system bus 120. The ROM 121 stores various control programs, maintenance sequences, and the like executed by the CPU 119. The RAM 122 temporarily stores data. The head driving unit 123 drives the recording head H.

The CPU 119 is electrically coupled to the motor driving unit 124 via the system bus 120. The motor driving unit 124 is electrically coupled to a carriage motor 65 and a transport motor 88.

The carriage motor 65 is included in the carriage driving unit described above. The carriage motor 65 reciprocates the carriage 11 in the X direction. The transport motor 88 drives the driving roller 5 described above to transport the recording medium P.

The CPU 119 is electrically coupled to the input-output unit 130 via the system bus 120. The input-output unit 130 is electrically coupled to the distance sensor S and a PC (Personal Computer) 129. The PC 129 is an information device that inputs recorded data and the like to the recording device 1.

The distance sensor S measures a height of a deposit in the corresponding measurement region A, and transmits a measurement result to the control unit 118. A time of the measuring of the height by the distance sensor S is not particularly limited, and the measurement may be performed every predetermined cumulative operating time of the recording device 1, or may be performed at the start of operation of the recording device 1.

The control unit 118 determines whether it is necessary to remove the deposit in the liquid receiving portion F1 described above or not, based on the measurement result of the distance sensor S. Specifically, it is determined that it is necessary to remove the deposit when, in measurement results in the plurality of measurement regions A, any one exceeds a threshold value. Alternatively, when the number of measurement regions A in which the threshold value is exceeded reaches a predetermined number, it may be determined that it is necessary to remove the deposit.

When the control unit 118 determines to remove the deposit in the liquid receiving portion F1, a cleaning liquid may be supplied from the cleaning liquid tank to the liquid receiving portion F1 to clean the liquid receiving portion F1. In this way, since the removal of the deposit is performed automatically, occurrence of defects such as contact between the deposit and the recording head H is prevented. Furthermore, convenience in using the recording device 1 is improved.

When the control unit 118 determines that it is necessary to remove the deposit in the liquid receiving portion F1, notification may be made that the deposit needs to be removed. A user of the recording device 1 removes the deposit in the liquid receiving portion F1 in response to the notification described above. Specifically, the above cleaning of the liquid receiving portion F1 may be performed manually, or the absorbent material of the liquid receiving portion F1 may be replaced to remove the deposit together with the absorbent material. Examples of the notification means include a display on a display panel (not illustrated) provided in the recording device 1 or on the PC 129, a notification sound, a voice, and a display light. This makes it possible to know an appropriate time period for maintaining the liquid receiving portion F1.

According to the present exemplary embodiment, the following advantages can be obtained. An ink deposit can be removed as needed. Specifically, a height of the deposit is measured, and whether it is necessary to remove the deposit or not is determined. Therefore, the removal of the deposit can be performed at an appropriate time. In this way, waste of ink and a cleaning liquid for removing the deposit is suppressed. Furthermore, even when a deposit grows rapidly, contact between the recording head H and the deposit is avoided. Therefore, it is possible to provide the recording device 1 in which a deposit can be removed as necessary.

2. Second Exemplary Embodiment

In a recording device according to the present exemplary embodiment, the arrangement of the liquid receiving portion F1 is changed with respect to the recording device 1 of the first exemplary embodiment. In the following description, the same components as those in the first exemplary embodiment are given the same reference signs, and redundant descriptions of these components will be omitted.

Figure 8:
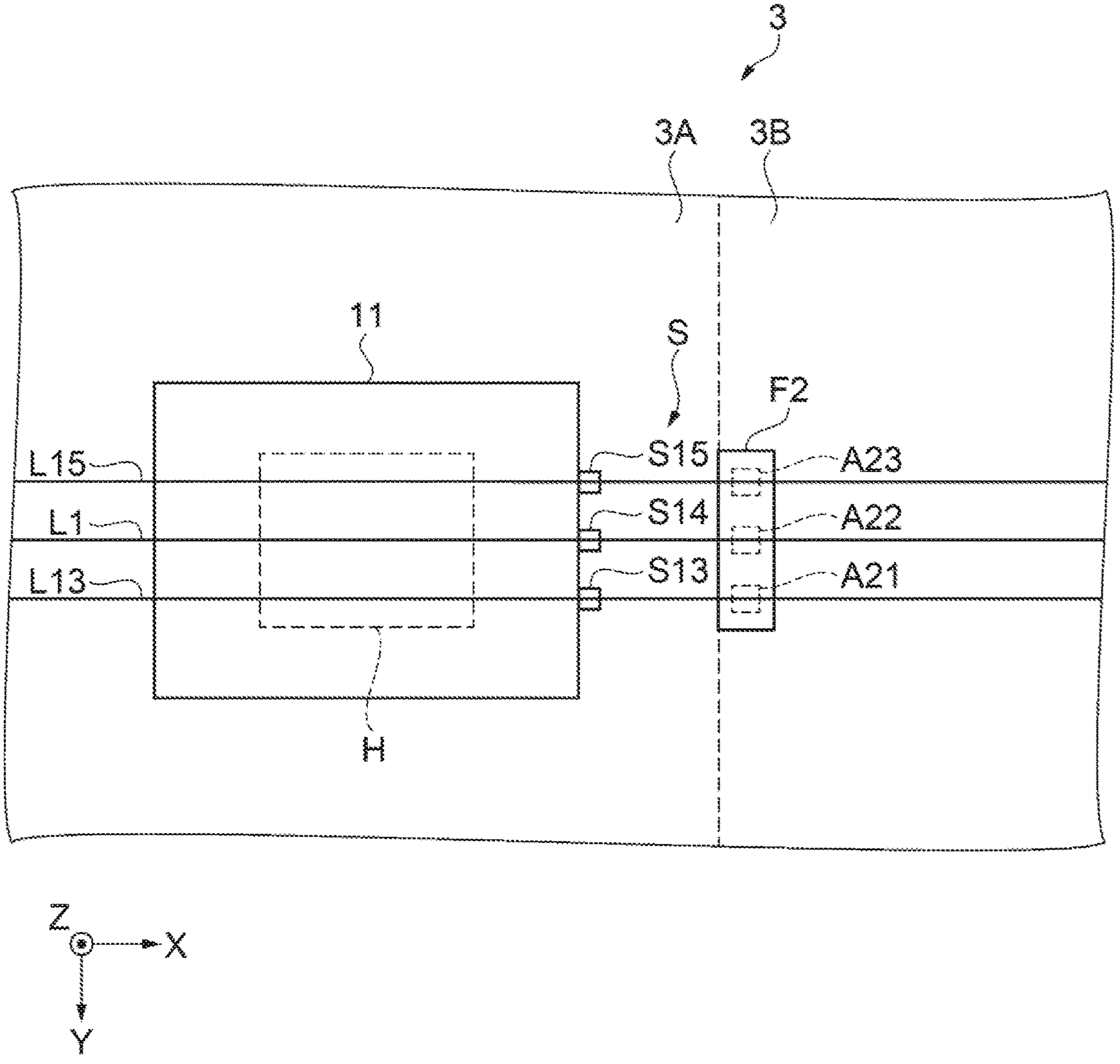
FIG. 8 is a schematic plan view illustrating an arrangement of a liquid receiving portion and the like according to a second exemplary embodiment.

As illustrated in FIG. 8, the recording device according to the present exemplary embodiment includes a liquid receiving portion F2 for frame-less printing. The liquid receiving portion F2 is in the platen 3B, and is disposed along a boundary between the platens 3A and 3B. The liquid receiving portion F2 is disposed so as to be able to face the recording head H, by the carriage 11 performing scanning in the +X direction.

The liquid receiving portion F2 is a substantially rectangular opening that is opened upward. A length in a direction along the Y-axis of the liquid receiving portion F2 is substantially equal to a length in a direction along the Y-axis of the recording head H, and is longer than a length in a direction along the Y-axis of the nozzle surface F. A length of the liquid receiving portion F2 in the X direction is shorter than a length in the X direction of the carriage 11, and is shorter than a length in the X direction of the nozzle surface F.

The liquid receiving portion F2 is adjacent to the right of the recording medium P during recording on the recording medium P. Therefore, when frame-less printing is performed to a right end of the recording medium P, a part of ink discharged from the recording head H is discarded into the liquid receiving portion F2. In the liquid receiving portion F2, an absorbent material is disposed in the same manner as in the above-described exemplary embodiment, and a cleaning liquid is supplied from a cleaning liquid tank.

The virtual straight lines L1, L13, and L15 cross the liquid receiving portion F2. A measurement region A22 is provided as the measurement region A at a position where the virtual straight line L1 and the liquid receiving portion F2 planarly overlap. A measurement region A21 is provided as the measurement region A at a position where the virtual straight line L13 and the liquid receiving portion F2 planarly overlap. A measurement region A23 is provided as the measurement region A at a position where the virtual straight line L15 and the liquid receiving portion F2 planarly overlap.

A height of a deposit in the measurement region A21 is measured by the distance sensor S13, and the height of the deposit in the measurement region A22 is measured by the distance sensor S14, and the height of the deposit in the measurement region A23 is measured by the distance sensor S15.

Note that, the arrangement and number of liquid receiving portions F2 are not limited to the above. A plurality of the liquid receiving portions F2 may be disposed at the platen 3A in accordance with a size or a shape of the recording medium P. For example, a liquid receiving portion adjacent to the left of the recording medium P may be provided. In addition, a liquid receiving portion for frame-less printing may be provided at the platen 3A corresponding to the recording medium P having a narrow width in the left-right direction. Furthermore, both the liquid receiving portions F1 and F2 may be provided. In this case as well, a cleaning liquid may be delivered from a cleaning liquid tank to the carriage 11, and supplied to the liquid receiving portion F1 from a nozzle provided at the carriage 11. In a configuration in which the cleaning liquid is supplied via the carriage 11, a pipe and the like for supplying the cleaning liquid to each of the plurality of liquid receiving portions are not required.

According to the present exemplary embodiment, the following effect can be achieved in addition to the effect of the first exemplary embodiment. It is possible to suppress growth of a deposit caused by ink-discarding during frameless printing.

3. Third Exemplary Embodiment

In a recording device according to the present exemplary embodiment, the arrangement of the distance sensor S is changed with respect to the recording device 1 according to the first exemplary embodiment. In the following description, the same components as those in the first exemplary embodiment are given the same reference signs, and redundant descriptions of these components will be omitted.

Figure 9:
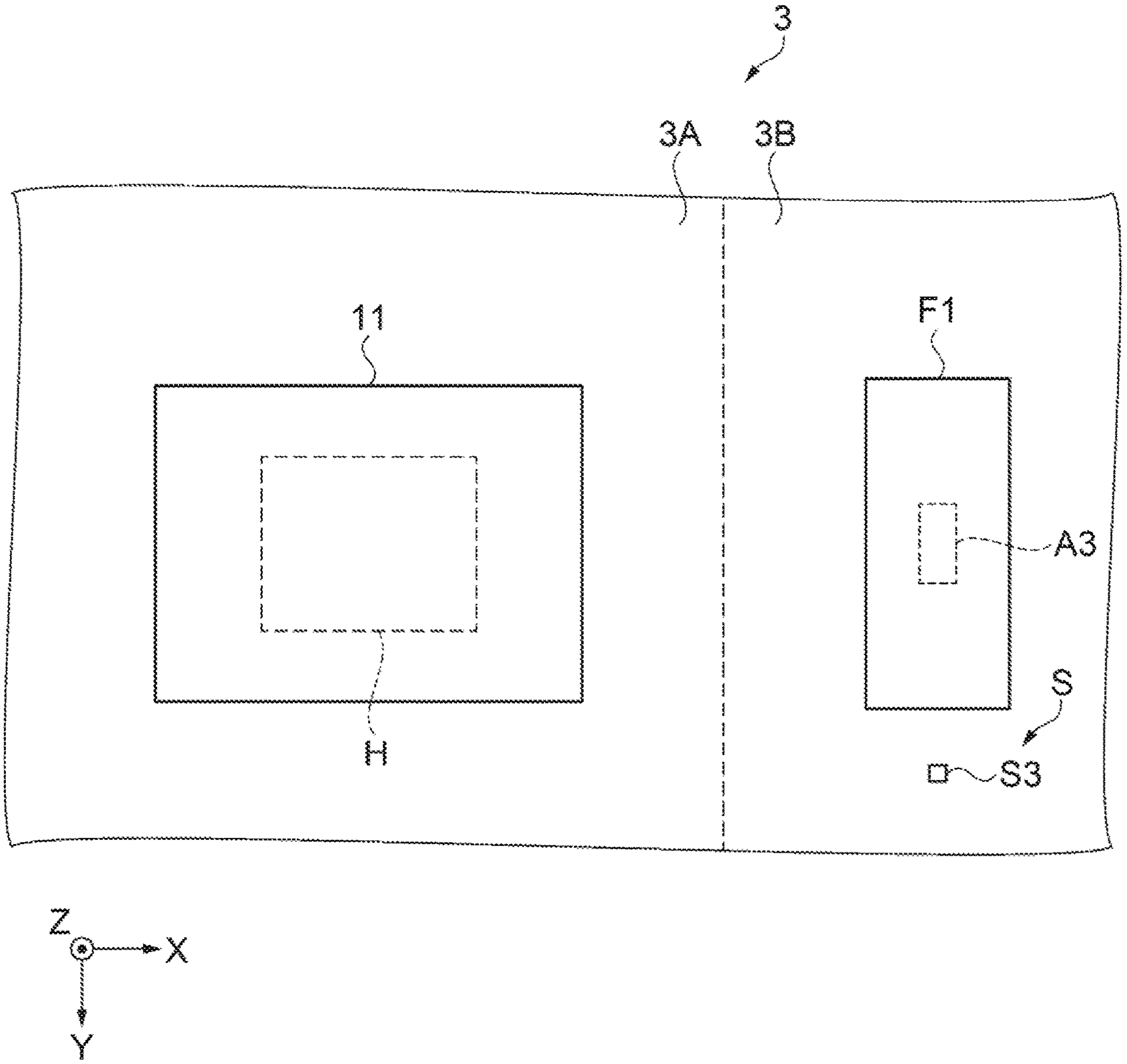
FIG. 9 is a schematic plan view illustrating an arrangement of a distance sensor and the like according to a third exemplary embodiment.

As illustrated in FIG. 9, in the recording device according to the present exemplary embodiment, a distance sensor S3 as the distance sensor S is disposed at a fixing member other than the carriage 11. The fixing member here refers to a frame member or an outer packaging housing.

The distance sensor S3 is disposed in the +Y direction of the liquid receiving portion F1. The distance sensor S3 emits ultrasonic waves in the −Y direction, and a height of a deposit in the measurement region A3 is measured.

The control unit 118 described above stops measurement of a position of a top portion of a deposit by the distance sensor S3, when the carriage 11 is present at a position planarly overlapping the liquid receiving portion F1. The time when the carriage 11 is present at the position described above is, for example, a period during which the recording head H is discarding ink into the liquid receiving portion F1.

According to the present exemplary embodiment, the following effect can be achieved in addition to the effect of the first exemplary embodiment. It is possible to prevent the distance sensor S3 from mistaking the carriage 11 for a deposit. Further, since the distance sensor S is not installed at the carriage 11 which is a moving object, measurement accuracy can be improved.

4. Fourth Exemplary Embodiment

In a recording device according to the present exemplary embodiment, the arrangement of the distance sensor S is changed with respect to the configuration illustrated in FIG. 6 of the recording device 1, in the first exemplary embodiment. In the following description, the same components as those in the first exemplary embodiment are given the same reference signs, and redundant descriptions of these components will be omitted.

Figure 10:
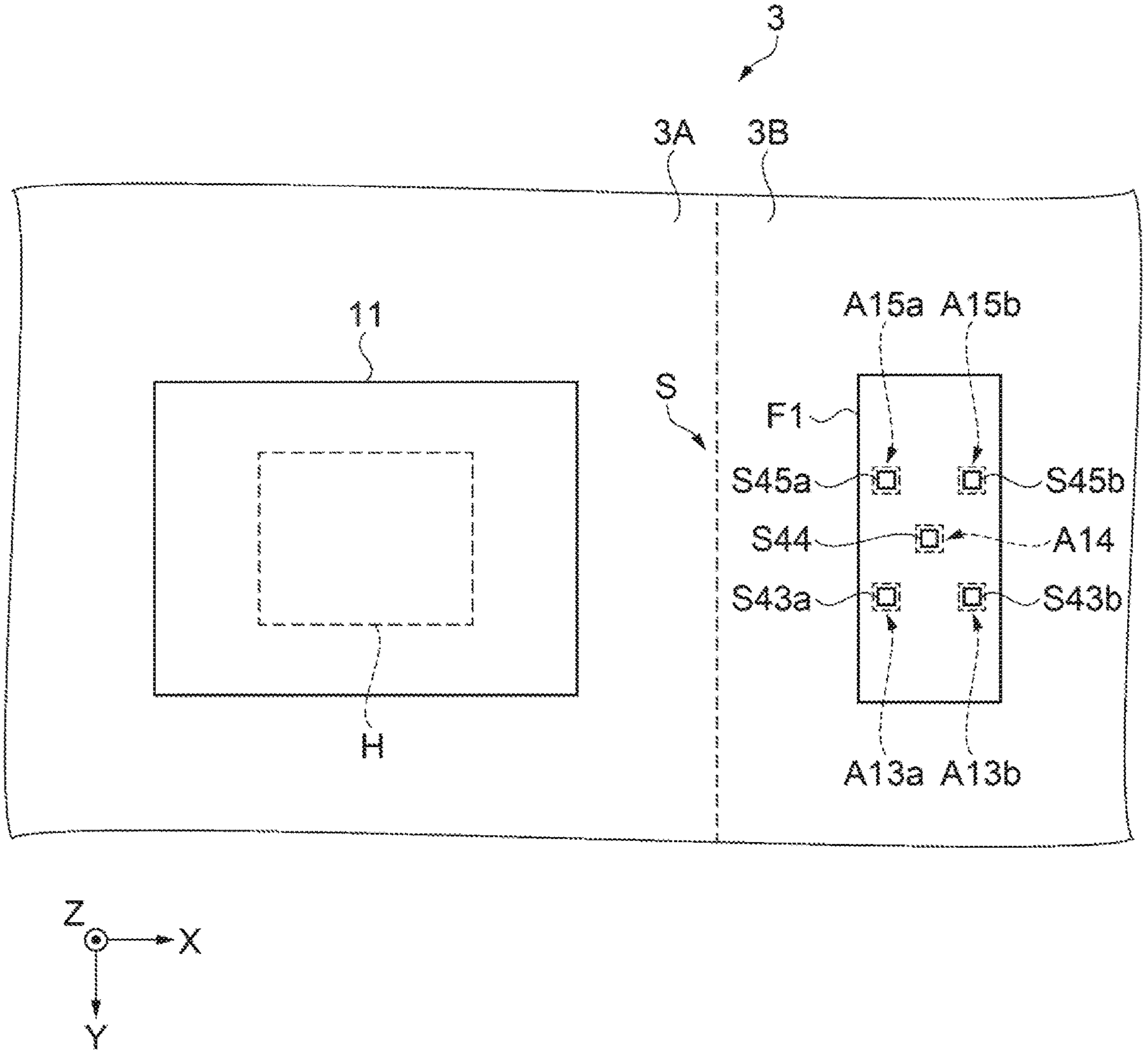
FIG. 10 is a schematic plan view illustrating an arrangement of a distance sensor and the like according to a fourth exemplary embodiment.

As illustrated in FIG. 10, in the recording device according to the present exemplary embodiment, distance sensors S43*a*, S43*b*, S44, S45*a*, and S45*b*, as the distance sensors S are disposed above the liquid receiving portion F1. The five distance sensors S43*a*, S43*b*, S44, S45*a*, and S45*b* are disposed at a fixing member such as a frame member or an outer packaging housing.

The distance sensor S43*a* faces a measurement region A13*a*, the distance sensor S43*b* faces a measurement region A13*b*, the distance sensor S44 faces a measurement region A14, the distance sensor S45*a* faces a measurement region A15*a*, and the distance sensor S45*b* faces a measurement region A15*b*, to measure a height of a deposit.

The control unit 118 described above stops measurement of a position of a top portion of a deposit by the distance sensor S, when the carriage 11 is present at a position planarly overlapping the liquid receiving portion F1. The time when the carriage 11 is present at the position described above is, for example, a period during which the recording head H is discarding ink into the liquid receiving portion F1.

According to the present exemplary embodiment, in addition to the effect of the first exemplary embodiment, it is possible to prevent the distance sensor S from mistaking the carriage 11 for a deposit. Further, since the distance sensor S is not installed at the carriage 11 which is a moving object, measurement accuracy can be improved.

What is claimed is:

1. A recording device, comprising:

a recording head configured to discharge liquid onto a recording medium to perform recording;

a carriage mounted with the recording head, and configured to perform scanning;

a liquid receiving portion disposed so as to face the recording head so that the recording head discards the liquid into the liquid receiving portion;

a measurement unit configured to measure a position of a top portion in a vertical direction of a deposit formed by the liquid deposited in the liquid receiving portion; and a control unit configured to determine, based on a result of the measurement by the measurement unit, whether the deposit in the liquid receiving portion needs to be removed.

2. The recording device according to claim 1, wherein when determining that the deposit in the liquid receiving portion needs to be removed, the control unit supplies a cleaning liquid to the liquid receiving portion to clean the liquid receiving portion.

3. The recording device according to claim 1, wherein when determining that the deposit in the liquid receiving portion needs to be removed, the control unit notifies that the deposit needs to be removed.

4. The recording device according to claim 1, wherein the measurement unit is provided at a plurality of locations where a position of the top portion of the deposit is measurable.

5. The recording device according to claim 1, wherein the measurement unit is provided at a position, in the carriage, configured to face the liquid receiving portion.

6. The recording device according to claim 5, wherein a plurality of the measurement units are provided, and the plurality of measurement units are disposed shifted from each other when viewed from a transport direction of the recording medium.

7. The recording device according to claim 1, wherein the measurement unit is disposed at a fixing member other than the carriage, and when the carriage is located at a position where the carriage overlaps the liquid receiving portion in a plane, the control unit stops the measurement of the position.

8. The recording device according to claim 1, wherein the measurement unit includes an ultrasonic sensor including a thin film piezoelectric element.

* * * * *